(12) United States Patent
Manohar et al.

(10) Patent No.: US 12,244,231 B2
(45) Date of Patent: Mar. 4, 2025

(54) POWER CONVERTER WITH OVERDRIVE SWITCH CONTROL

(71) Applicant: Apple Inc., Cupertino, CA (US)

(72) Inventors: Sujan K. Manohar, Austin, TX (US);
Jay B. Fletcher, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/634,182

(22) Filed: Apr. 12, 2024

(65) Prior Publication Data

US 2024/0258924 A1  Aug. 1, 2024

Related U.S. Application Data

(63) Continuation of application No. 17/651,173, filed on Feb. 15, 2022, now Pat. No. 12,034,370.

(51) Int. Cl.
*H02M 3/158* (2006.01)
*H02M 1/088* (2006.01)
*H02M 3/07* (2006.01)

(52) U.S. Cl.
CPC ........... *H02M 3/158* (2013.01); *H02M 1/088* (2013.01); *H02M 3/07* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069
See application file for complete search history.

(56) References Cited

U.S. PATENT DOCUMENTS

| | | |
|---|---|---|
| 7,973,564 B1 | 7/2011 | Chuang et al. |
| 8,981,840 B1 | 3/2015 | Tyrrell et al. |
| 10,263,522 B2 | 4/2019 | Kondo et al. |
| 10,700,590 B2 | 6/2020 | Akahane |

(Continued)

*Primary Examiner* — Jeffrey A Gblende
(74) *Attorney, Agent, or Firm* — Kowert, Hood, Munyon, Rankin & Goetzel, P.C.; Nicholas E. Chremos; Dean M. Munyon

(57) ABSTRACT

In some embodiments, a power converter circuit included in a computer system magnetizes and de-magnetizes an inductor coupled to a switch node using high-side and low-side switches to alternatively couple a switch node to an input power supply node and a ground supply node. In response to detecting a drop in the voltage level of the input power supply node, the power converter circuit may adjust an on-resistance of the high-side switch to maintain performance at the lower voltage level of the input power supply node.

25 Claims, 11 Drawing Sheets

(56) References Cited

U.S. PATENT DOCUMENTS

| | | |
|---|---|---|
| 11,482,929 B2 | 10/2022 | Hayashi |
| 2011/0032028 A1 | 2/2011 | Nakashima |
| 2018/0269789 A1 | 9/2018 | Kondo et al. |
| 2020/0153427 A1 | 5/2020 | Bagheri et al. |

POWER CONVERTER WITH OVERDRIVE SWITCH CONTROL

CROSS-REFERENCE TO RELATED APPLICATIONS

The present application is a continuation of U.S. application Ser. No. 17/651,173 entitled "Power Converter With Overdrive Switch Circuit," filed Feb. 15, 2022, the disclosure of which is incorporated by reference herein in its entirety.

BACKGROUND

Technical Field

This disclosure relates to power management in computer systems and, more particularly, to voltage regulator circuit operation.

Description of the Related Art

Modern computer systems may include multiple circuits blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulator voltage levels on respective power supply signals using a voltage level of an input power supply signal. Such regulator circuits may employ multiple passive circuit elements such as inductors, capacitors, and the like.

SUMMARY OF THE EMBODIMENTS

Various embodiments for reducing a resistance between an input power supply and a switch node of a power converter during an active period are disclosed. Broadly speaking, a power converter circuit includes a switch circuit and a control circuit. The switch circuit includes a high-side switch coupled between an input power supply node and the switch node which is coupled to a regulated power supply node via an inductor. The high-side switch is configured to couple the input power supply node to the switch node during an active time period. The control circuit is configured to monitor a voltage level of the input power supply node and decrease, during the active time period, an on-resistance of the high-side switch in response to a determination that the voltage level of the input power supply node is less than a threshold value.

DETAILED DESCRIPTION OF EMBODIMENTS

Figure 1:
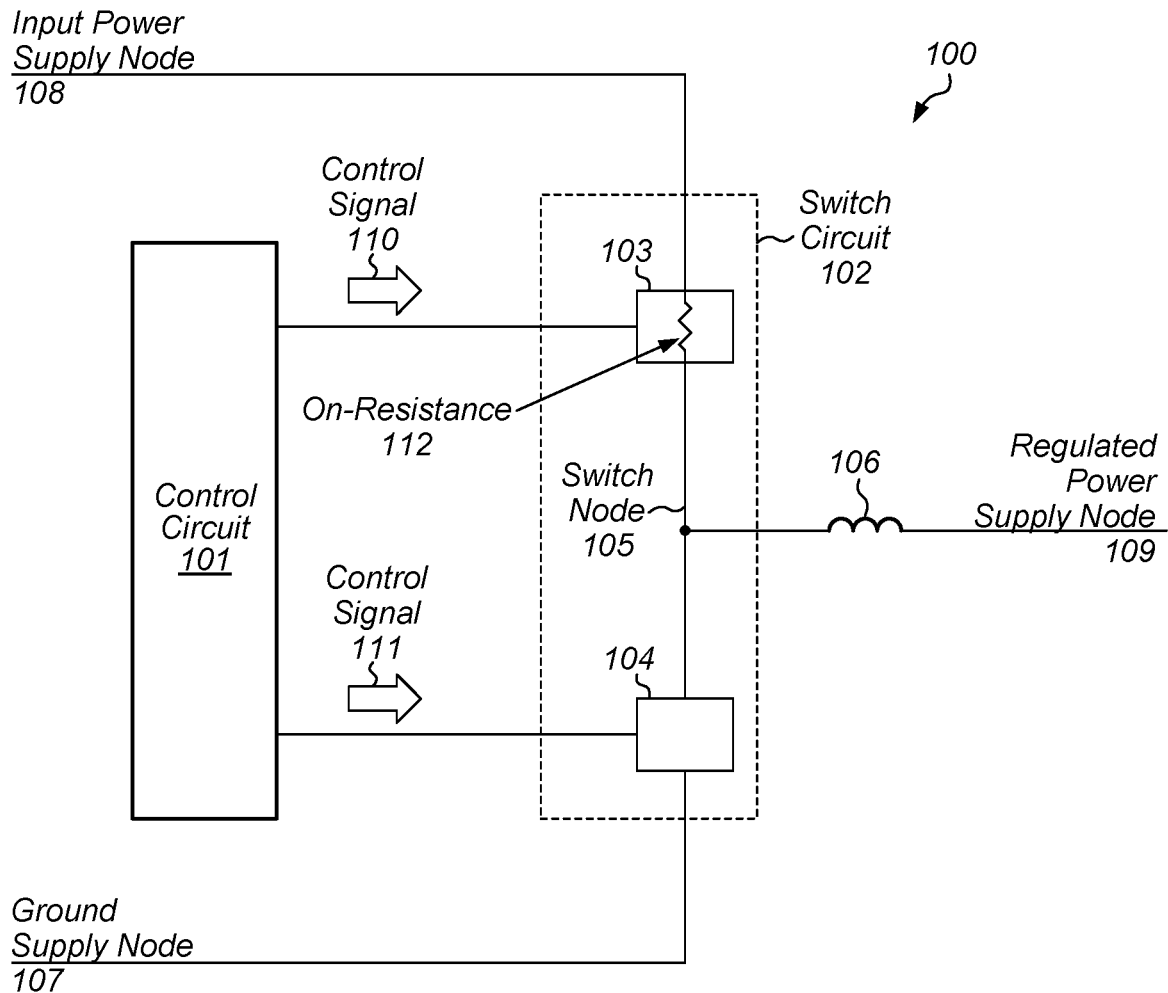
FIG. 1 is a block diagram of an embodiment of a power converter circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node and is referred to as the "low-side switch."

When the high-side switch is closed (referred to as "on-time"), energy is applied to the inductor, resulting in an increase in the current flowing through the inductor. During this time, the inductor stores energy in the form of a magnetic field in a process referred to as "magnetizing" the inductor. When the high-side switch is opened and the low-side switch is closed, energy is no longer being applied to the inductor and the voltage across the inductor reverses, which results in the inductor functioning as a current source with the energy stored in the inductor's magnetic field supporting the current flowing into the load. The process of closing and opening the high-side and low-side switches is performed periodically to maintain a desired voltage level on the power supply node.

Power converter circuits may employ different regulation modes to determine periodicity and duration of on-time and off-times. For example, a power converter circuit may detect a maximum current flowing through its inductor to determine an end of an on-time period. This type of regulation mode is referred to as a "peak-current regulation mode." Alternatively, a power converter circuit may detect a minimum current flowing through its inductor to determine an end of an off-time period. This type of regulation mode is referred to as a "valley-current regulation mode."

In many applications, the input power supply to a power converter circuit may be a battery at least part of the time. For example, in mobile devices such as phones and tablets, power is drawn from a battery when the device is not connected to a charging circuit. As energy is drawn from the battery by the power converter circuit, the energy stored in the battery is depleted, resulting in a drop in the voltage supplied by the battery.

When the battery voltage drops, the voltage across the high-side switch decreases as the power converter circuit tries to maintain a desired voltage on its regulated power supply node. In cases where the high-side switch is implemented using a metal-oxide-semiconductor field-effect transistor (MOSFET), the drop in the battery voltage results in a drop in the gate-to-source voltage of the MOSFET. The decrease in the gate-to-source voltage of the MOSFET increases the on-resistance of the MOSFET. The increase in the on-resistance of the high-side switch increases power loss across the high-side switch and limits the current that can be supplied to the load, thereby limiting the efficiency of the power converter circuit under low voltage conditions.

To improve the efficiency of a power converter circuit under low voltage conditions, the on-resistance of the high-side switch of the power converter circuit is reduced in response to a decrease in the voltage level of the power converter circuit's input power supply. By decreasing the on-resistance of the high-side switch, power loss across the switch can be reduced and the current to the load can be maintained under low voltage conditions, which can extend the usable battery voltage range and longevity. Various techniques may be employed to decrease the on-resistance of the high-side switch in response to a detection of a low voltage condition. For example, in some cases, additional devices may be coupled in parallel with the high-side switch to decrease the resistance between the input power supply and the switch node of the power converter circuit. The embodiments illustrated in the drawings and described below may provide techniques for a power converter to detect a drop in the voltage level of its input power supply, and decrease the on-resistance of the high-side switch by adjusting the active level of control signals coupled to the high-side switch.

A block diagram depicting an embodiment of a power converter circuit is illustrated in FIG. 1. As illustrated, power converter circuit 100 includes control circuit 101 and switch circuit 102, which includes high-side switch 103 and low-side switch 104.

High-side switch 103 is coupled between input power supply node 108 and switch node 105, which is coupled to regulated power supply node 109 via inductor 106. Low-side switch 104 is coupled between switch node 105 and ground supply node 107. High-side switch 103 is configured to couple switch node 105 to input power supply node 108 during an active time period, while low-side switch 104 is configured to couple switch node 105 to ground supply node 107 during an inactive time period.

During the active time period, current flows from input power supply node 108 to switch node 105 and into regulated power supply node 109 via inductor 106. As current flows into regulated power supply node 109, the magnetic field of inductor 106 increases, magnetizing inductor 106. During the inactive time period, switch node 105 is decoupled from input power supply node 108 and coupled to ground supply node 107. Without the energy provided by input power supply node 108 being applied to regulated power supply node 109 via inductor 106, the magnetic field of inductor 106 begins to collapse. The collapsing magnetic field of inductor 106 results in a current flowing from inductor 106 to regulated power supply node 109.

Control circuit 101 is configured to monitor a voltage level of input power supply node 108, and to control the operation of high-side switch 103 and low-side switch 104 via control signal 110 and control signal 111, respectively. In response to a determination that the voltage level of input power supply node 108 is less than a threshold value, control circuit 101 is further configured to decrease, during the active time period, on-resistance 112 of high-side switch 103. In various embodiments, to decrease on-resistance 112 of high-side switch 103, control circuit 101 is further configured to change an active level of control signal 110 during the active time period. By decreasing on-resistance 112 of high-side switch 103, in response to the determination that the voltage level of input power supply node 108 is less than the threshold value, control circuit 101 may, in various embodiments, maintain the efficiency of the power transfer from input power supply node 108 to regulated power supply node 109 despite the reduction in the voltage level of input power supply node 108.

Figure 2:
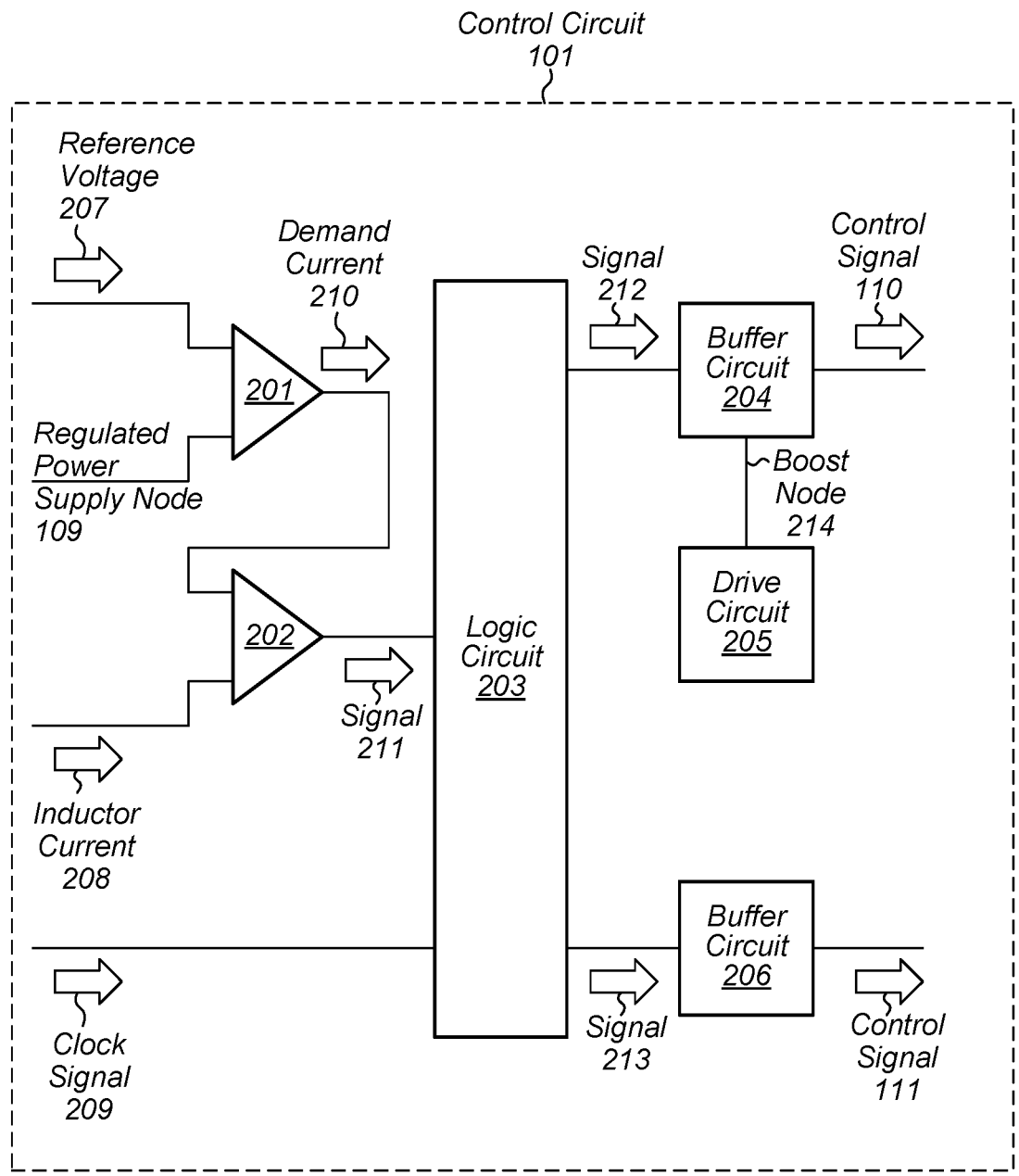
FIG. 2 is a block diagram of an embodiment of a control circuit included in a power converter circuit.

Turning to FIG. 2, a block diagram of an embodiment of control circuit 101 is depicted. As illustrated, control circuit 101 includes comparator circuits 201 and 202, logic circuit 203, buffer circuit 204, drive circuit 205, and buffer circuit 206.

Comparator circuit 201 is configured to generate demand current 210 using reference voltage 207 and a voltage level of regulated power supply node 109. In various embodiments, comparator circuit 201 is configured to generate demand current 210 such that a value of demand current 210 is proportional to a difference between the voltage level of regulated power supply node 109 and reference voltage 207. It is noted that, in some embodiments, reference voltage 207 may correspond to a desired value for the voltage level of regulated power supply node 109. In various embodiments, comparator circuit 201 may be implemented using a differential amplifier or other suitable circuit.

Comparator circuit 202 is configured to generate signal 211 using demand current 210 and inductor current 208. It is noted that inductor current 208 may, in some embodiments, correspond to a current flowing in inductor 106 during an active period. In various embodiments, comparator circuit 202 is further configured to compare demand current 210 to inductor current 208, and activate signal 211 in response to a determination that inductor current 208 is greater than demand current 210. Comparator circuit 202 may, in some embodiments, be implemented as a differential amplifier or other suitable circuit.

Logic circuit 203 is configured to generate signals 212 and 213 using signal 211 and clock signal 209. In various embodiments, logic circuit 203 is configured to activate signal 212 and de-activate signal 213, in response to an activation of clock signal 209. Logic circuit 203 may be further configured to de-activate signal 212 and activate signal 213 in response to an activation of signal 211. It is noted that such an activation and de-activation scheme of signals 212 and 213 may be used in conjunction with peak-current regulation. In cases where valley-current regulation is employed, the activation and de-activation of signals 212 and 213 may be different. Logic circuit 203 may, in some embodiments, be implemented using a microcontroller, state machine, or other suitable sequential logic circuit.

Drive circuit 205 is configured to generate a voltage level on boost node 214. As described below, drive circuit 205 may be further configured to adjust the voltage level on boost node 214 based on a voltage level of input power supply node 108. In various embodiments, an initial voltage level on boost node 214 may be based on how high-side switch 103 is implemented.

Buffer circuit 204 is configured to generate control signal 110 using signal 212 and a voltage level of boost node 214. As described below, a virtual supply or virtual ground node of buffer circuit 204 may be coupled to boost node 214. As the voltage level of boost node 214 is adjusted by drive circuit 205, buffer circuit 204 is configured to adjust an active level of control signal 110 using the voltage level of boost node 214. In various embodiments, buffer circuit 204 may additionally provide the drive strength needed to drive a load of high-side switch 103 and its associated wiring.

Buffer circuit 206 is configured to generate control signal 111 using signal 213. In various embodiments, buffer circuit 206 may provide additional drive strength in order to drive a load of low-side switch 104 and its associated wiring. Buffer circuit 206 may, in some embodiments, be implemented using one or more inverting or non-inverting amplifier circuits arranged in a serial fashion.

It is noted that the embodiment of control circuit 101 depicted in FIG. 2, corresponds to a particular regulation technique. In other embodiments, the topology and operation of control circuit 101 may be different in order to use other regulation techniques.

Figure 3:
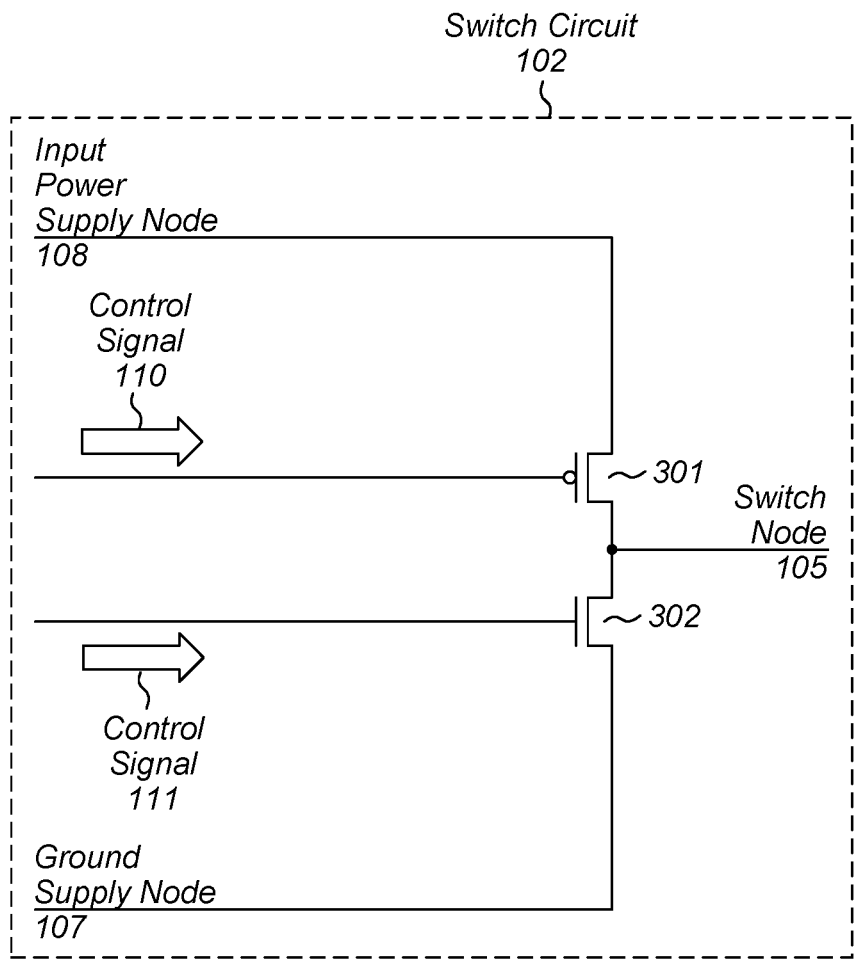
FIG. 3 is a block diagram of an embodiment of a switch circuit included in a power converter circuit.

A block diagram of switch circuit 102 is depicted in FIG. 3. As illustrated, switch circuit 102 includes devices 301 and 302. In various embodiments, device 301 may correspond to high-side switch 103, and device 302 may correspond to low-side switch 104. Although devices 301 and 302 are depicted as being single devices, in other embodiments, devices 301 and 302 may each include multiple devices coupled in parallel.

Device 301 is coupled between input power supply node 108 and switch node 105, and is controlled by control signal 110. In various embodiments, device 301 is configured to couple switch node 105 to input power supply node 108 in response to an activation of control signal 110. Device 301 may be implemented as one or more p-channel MOSFETs, fin field-effect transistors (FinFETS), gate-all-around (GAAFETs), or any other suitable transconductance devices. In such cases, an activation level of control signal 110 may be at or near ground potential.

As described above, the on-resistance of high-side switch 103 and, therefore, the on-resistance of device 301, may be increased in response to a reduction in the voltage level of input power supply node 108. The increase in the on-resistance of device 301 is a result of a reduction in the gate-to-source voltage of device 301 resulting from the reduction of the voltage level of input power supply node 108. As the gate-to-source voltage of device 301 decreases, device 301 is not fully activated, which limits the amount of current it can pass from source to drain. To remediate the effects of the decrease in the gate-to-source voltage on the on-resistance of device 301, various techniques may be employed to return the on-resistance of device 301 to a desired value.

One technique to increase the on-resistance of device 301 when the voltage level of input power supply node 108 decreases involves adjusting the activation level of control signal 110. In various embodiments, an adjusted level of the activation level of control signal 110 may be based on how device 301 is implemented.

In the case where device 301 includes one or more p-channel MOSFETs, the activation level of control signal 110 is at or near ground potential. When the voltage level of input power supply node 108 decreases, the activation level of control signal 110 may be adjusted to a voltage less than ground potential, thereby recovering the loss in the gate-to-source voltage of device 301 and allowing device 301 to completely activate.

Device 302 is coupled between switch node 105 and ground supply node 107, and is controlled by control signal 111. In various embodiments, device 302 is configured to couple switch node 105 to ground supply node 107. Device 302 may, in some embodiments, be implemented as one or more n-channel MOSFETs, and an activation level of control signal 111 may be at or near the voltage level of input power supply node 108.

Figure 4:
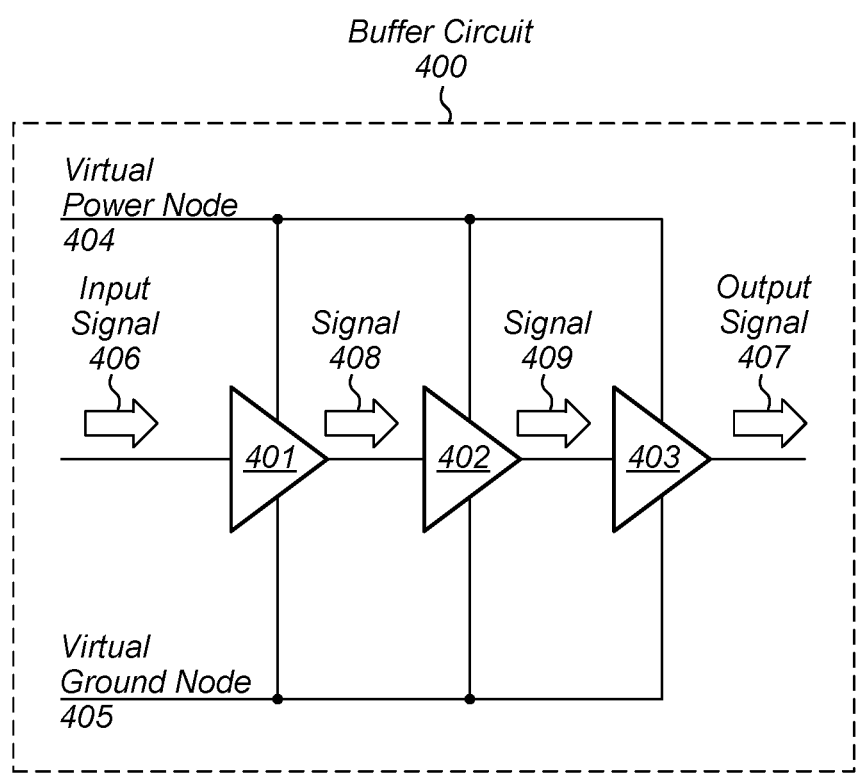
FIG. 4 is a block diagram of an embodiment of a buffer circuit included in a power converter circuit.

Turning to FIG. 4, a block diagram of an embodiment of a buffer circuit is depicted. As illustrated, buffer circuit 400 includes driver circuits 401-403. Although only three driver circuits are depicted in the embodiment of FIG. 4, in other embodiments, any suitable number of driver circuits may be employed. It is noted that in various embodiments, buffer circuit 400 may correspond to either of buffer circuits 204 or 206 as depicted in the embodiment of FIG. 2.

Each of driver circuits 401-403 are coupled to virtual power node 404 and virtual ground node 405. Driver circuit 401 is configured to generate signal 408 using input signal 406 and the respective voltage levels of virtual power node 404 and virtual ground node 405. Driver circuit 402 is configured to generate signal 409 using signal 408 and the respective voltage levels of virtual power node 404 and virtual ground node 405. In a similar fashion, driver circuit 403 is configured to generate output signal 407 using signal 409 and the respective voltage levels of virtual power node 404 and virtual ground node 405.

When buffer circuit 400 is used to implement buffer circuit 206, virtual power node 404 is coupled to input power supply node 108, and virtual ground node 405 is coupled to ground supply node 107. When buffer circuit 400 is used to implement buffer circuit 204, virtual power node 404 is coupled to input power supply node 108 and virtual ground node 405 is coupled to boost node 214.

In various embodiments, driver circuits 401-403 may be implemented using pairs of inverter circuits or any other suitable non-inverting amplifier circuits. It is noted that the respective drive capabilities of driver circuits 401-403 may be different. For example, the drive capability (or "fanout") of driver circuit 402 may be greater than the drive capability of driver circuit 401. Similarly, the drive capability of driver circuit 403 may be greater than the drive capability of driver circuit 402. By employing different drive capabilities, the overall ability of buffer circuit 400 to drive a given load may be adjusted.

Figure 5:
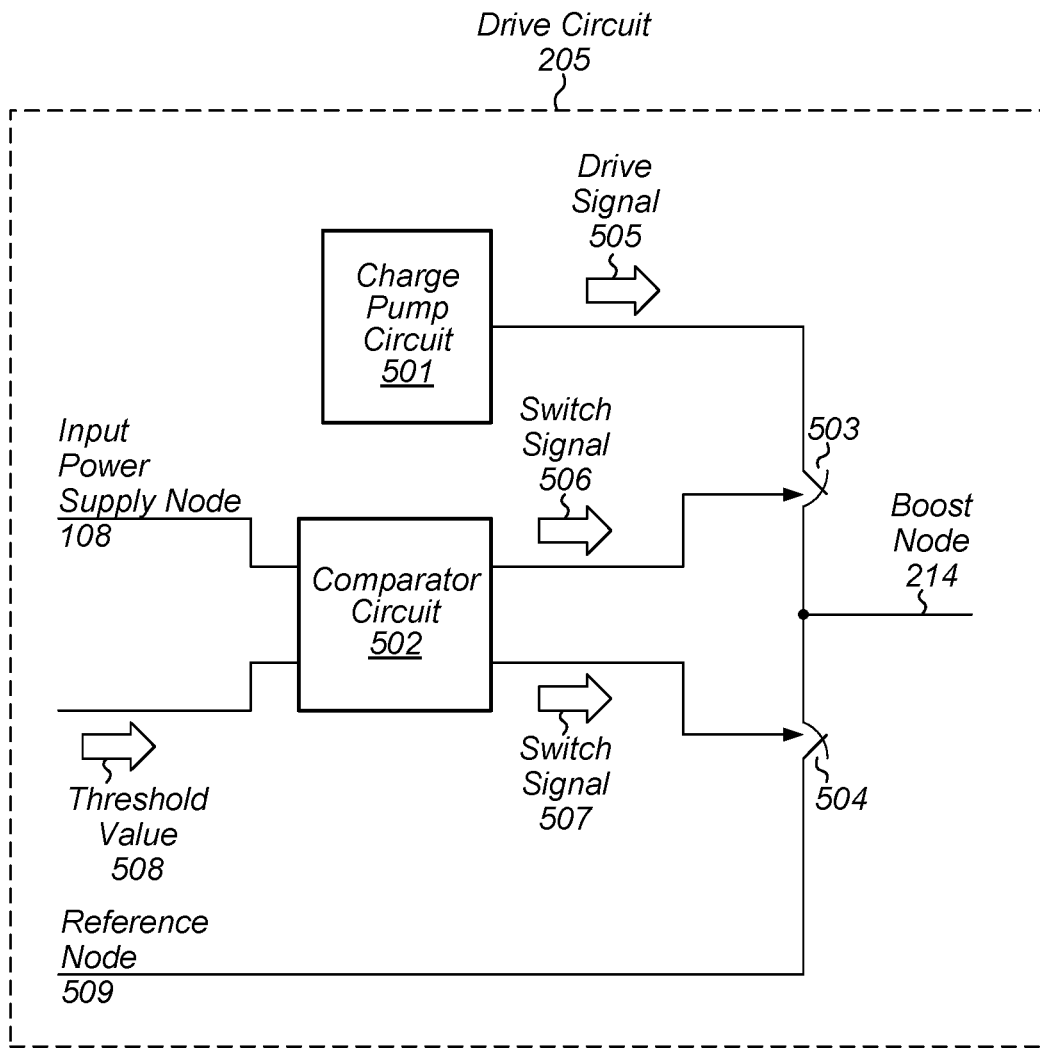
FIG. 5 is a block diagram of an embodiment of a drive circuit included in a power converter circuit.

Turning to FIG. 5, a block diagram of drive circuit 205 is depicted. As illustrated, drive circuit 205 includes charge pump circuit 501, comparator circuit 502, and switches 503 and 504.

Charge pump circuit 501 is configured to generate drive signal 505. In various embodiments, drive signal 505 may be used to generate a voltage on boost node 214 when switch 503 is closed. In cases where high-side switch 103 is implemented using one or more p-channel MOSFETs, charge pump circuit 501 may be configured to generate drive signal 505 such that a voltage level of drive signal 505 is less than ground potential.

Comparator circuit 502 is configured to generate switch signals 506 and 507 using a voltage level of input power supply node 108 and threshold value 508. In various embodiments, to generate switch signals 506 and 507, comparator circuit 502 may be further configured to compare the voltage level of input power supply node 108 to threshold value 508. Comparator circuit 502 may, in some embodiments, be configured to activate switch signal 507 and de-activate switch signal 506 in response to a determination that the voltage level of input power supply node 108 is greater than threshold value 508. Additionally, comparator circuit 502 may be further configured to de-activate switch signal 507 and activate switch signal 506 in response to a determination that the voltage level of input power supply node 108 is less than threshold value 508. In various embodiments, comparator circuit 502 may be implemented using a differential amplifier or any other suitable circuit configured to generate an output signal based on a comparison of at least two input voltage levels.

Switch 503 is coupled to an output of charge pump circuit 501 and boost node 214. In various embodiments, switch 503 is configured to couple, based on switch signal 506, the output of charge pump circuit 501 to boost node 214 allowing drive signal 505 to propagate onto boost node 214. Switch 503 may, in some embodiments, be implemented as one or more transistors arranged as a pass-gate structure, or any other suitable switch structure.

Switch 504 is coupled to reference node 509 and boost node 214. In various embodiments, switch 504 is configured to couple, based on switch signal 507, boost node 214 to reference node 509. Switch 504 may, in some embodiments, be implemented as one or more transistors arranged as a pass-gate structure, or any other suitable switch structure.

Figure 6:
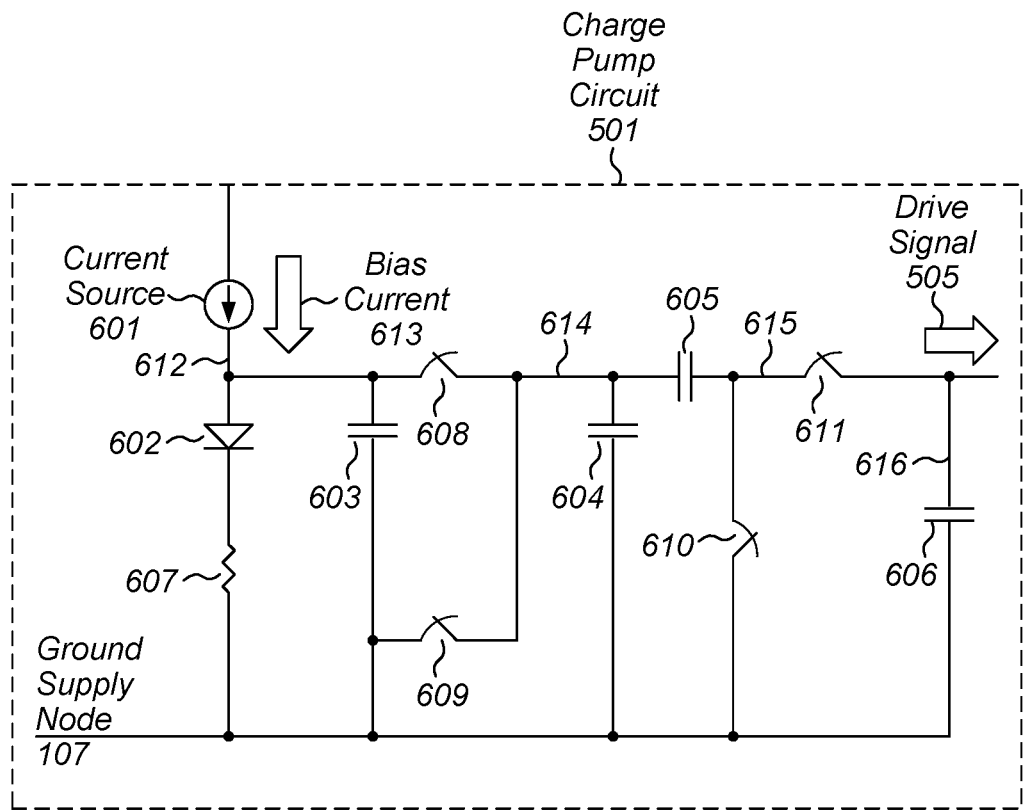
FIG. 6 is a block diagram of an embodiment of a charge pump circuit included in a drive circuit.

Turning to FIG. 6, a block diagram of an embodiment of charge pump circuit 501 is depicted. As illustrated, charge pump circuit 501 includes current source 601, diode 602, capacitors 603-606, resistor 607, and switches 608-611.

Current source 601 is configured to source bias current 613 to node 612. In various embodiments, current source 601 may be implemented as part of a current mirror circuit, or any other suitable circuit configured to source a constant current to a circuit node.

Diode 602 is coupled between node 612 and resistor 607. In various embodiments, a voltage level on node 612 is based on a voltage drop across diode 602 and resistor 607 resulting from bias current 613 flowing through diode 602 and resistor 607 into ground supply node 107. In various embodiments, diode 602 may be implemented as a diode-connected MOSFET or any other suitable PN junction structure. Resistor 607 may be implemented using metal, polysilicon, or any other material available in a semiconductor manufacturing process. In some cases, resistor 607 may be programmable to adjust the voltage level on node 612 to account for losses within charge pump circuit 501.

Capacitor 603 is coupled between node 612 and ground supply node 107. Switch 608 is coupled between nodes 612 and 614, while switch 609 is coupled between node 614 and ground supply node 107. Capacitor 604 is coupled between node 614 and ground supply node 107. Capacitor 605 is coupled between node 614 and node 615. Switch 610 is coupled between node 615 and ground supply node 107, while switch 611 is coupled between node 615 and 616. Capacitor 606 is coupled between node 616 and ground supply node 107.

Capacitor 603 is charged to the voltage level of node 612 and helps maintain the voltage level of node 612 as switch 608 is opened and closed. During a first period of time, switches 608 and 610 are closed, while switches 609 and 611 are open. While switches 608 and 610 are closed, node 614 is coupled to node 612, and capacitor 604 is charged to the voltage level of node 612. Additionally, node 615 is coupled to ground supply node 107, discharging node 615 to ground potential.

During a second time period subsequent to the first time period, switches 608 and 610 are opened, while switches 609 and 611 are closed. When switch 609 is closed, node 614 is discharged to ground potential. When switch 611 is closed, node 615 is coupled to node 616.

The first and second time periods are repeated while the circuit is active, which produces a voltage on node 614 that transitions between ground potential and the voltage level of node 612. The changing voltage on node 614 is coupled to node 615 via capacitor 605, resulting in a negative voltage for drive signal 505.

In various embodiments, capacitors 603-606 may be implemented using a metal-oxide-metal (MOM) structure, a metal-insulator-metal (MIM), or any other suitable capacitor structure available in a semiconductor manufacturing process. Each of switches 608-611 may, in some embodiments, be implemented using two or more MOSFETs arranged as a pass gate circuit, or other suitable switching circuit.

Figure 7:
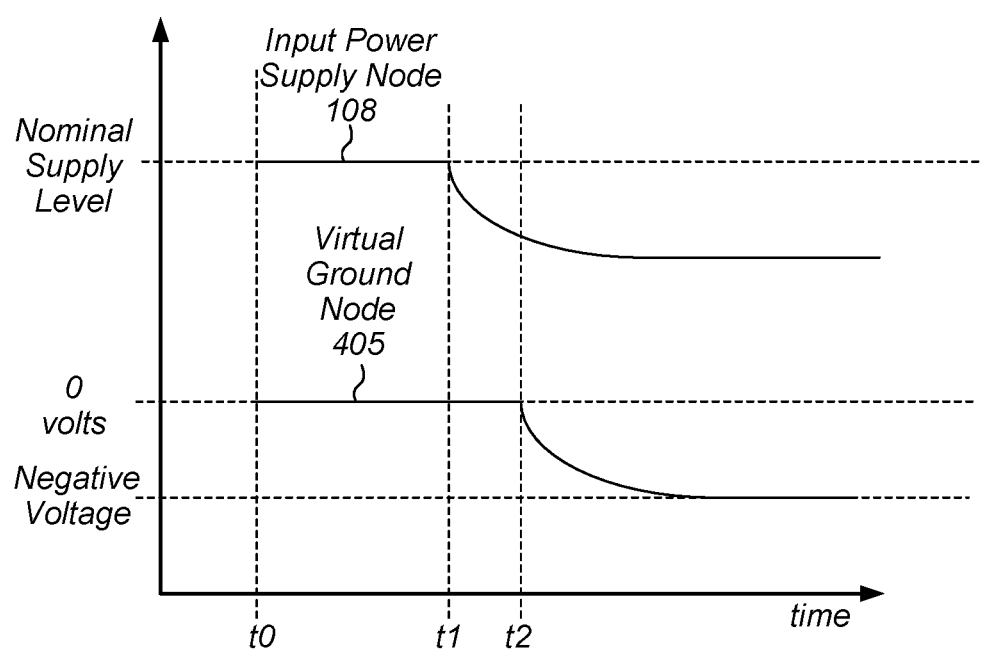
FIG. 7 illustrates example waveforms of a power converter circuit during an input voltage reduction.

Turning to FIG. 7, example waveforms associated with the operation of a power converter circuit are depicted. At time t0, input power supply node 108 is at a nominal supply level and virtual ground node 405 is at zero volts.

At time t1, the voltage level of input power supply node 108 begins to drop. As previously described, the reduction in the voltage level of input power supply node 108 may be a result of a depletion of charge in a battery or other suitable power source.

At time t2, the voltage level of input power supply node 108 has decreased to threshold value 508, which triggers a change in the value of virtual ground node 405. Once the voltage level of input power supply node 108 has reached threshold value 508, drive circuit 205 de-couples boost node 214 from ground supply node 107 and, instead, couples boost node 214 to drive signal 505. Since the high-side switch is implemented using p-channel MOSFETs, the voltage level of drive signal 505 is negative, which results in a negative voltage on virtual ground node 405. The negative voltage on virtual ground node 405 results in the active level of control signal 110 being negative during active periods of power converter circuit 100.

Figure 8:
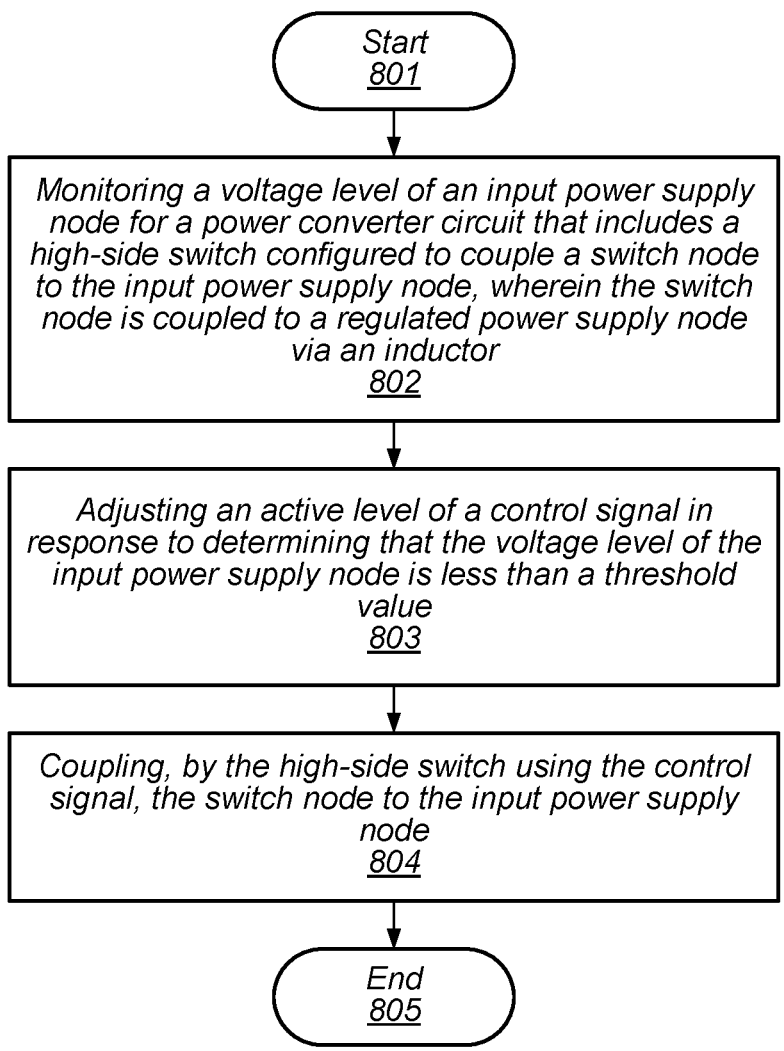
FIG. 8 is a flow diagram of an embodiment of a method for operating a power converter circuit.

Turning to FIG. 8, a flow diagram depicting an embodiment of a method for operating a power converter circuit is illustrated. The method, which may be applied to various power converter circuits including power converter circuit 100, begins in block 801.

The method includes monitoring a voltage level of an input power supply node for a power converter circuit that includes a high-side switch configured to couple a switch node to the input power supply node (block 802). In various embodiments, the switch node is coupled to a regulated power supply node via an inductor.

The method also includes adjusting an active level of a control signal in response to determining that the voltage level of the input power supply node is less than a threshold value (block 803). In various embodiments, monitoring the voltage level of the input power supply may include performing a comparison of the voltage level of the input power supply to a threshold value.

The way in which the active signal is adjusted depends on how the high-side switch is implemented. For example, in cases where the high-side switch is implemented using a p-channel MOSFET, adjusting the active level of the control signal includes setting the active level of the control signal to a voltage less than a ground potential.

To change the active level of the control signal, either the virtual power supply node or the virtual ground node of a buffer circuit configured to generate the control signal may be adjusted. In some cases, the method may include coupling a virtual ground node of the buffer circuit to a drive signal using results of the comparison of the voltage level of the input power supply node to the threshold value, where a voltage level of the drive signal is less than ground potential. The method may also include buffering, by the buffer circuit with its virtual ground node coupled to the drive signal, the control signal to generate a buffered signal, and coupling, by the high-side switch using the buffered signal, the switch node to the input power supply node.

In other cases, the method may include coupling a virtual power supply node of the buffer circuit to a drive signal using results of the comparison of the voltage level of the input power supply node to the threshold value, where a voltage level of the drive signal is greater than the voltage level of the input power supply node. The method may also include buffering, by the buffer circuit with its virtual power supply node coupled to the drive signal, the control signal to generate a buffered signal, and coupling, by the high-side switch using the buffered signal, the switch node to the input power supply node.

The method further includes coupling, by the high-side switch using the control signal, the switch node to the input power supply node (block 804). In various embodiments, the method also includes performing a comparison of a voltage level of the regulated power supply node to a reference voltage, and generating the control signal using the result of the comparison. The method concludes in block 805.

Figure 9:
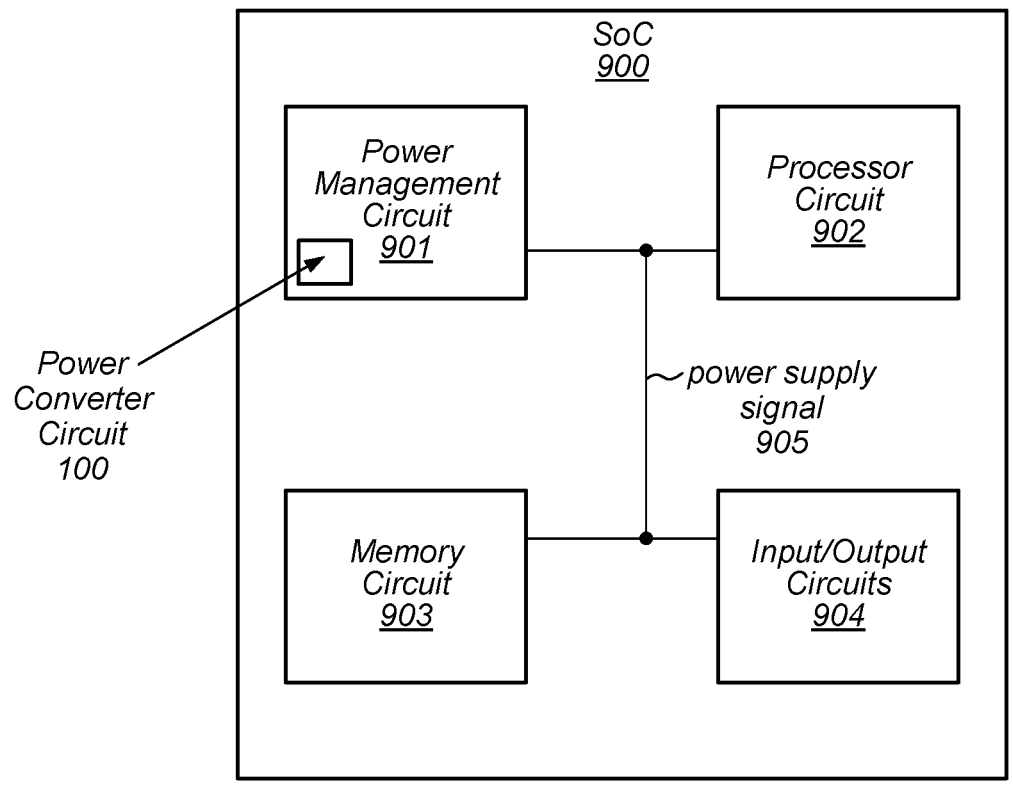
FIG. 9 is a block diagram of one embodiment of a system-on-a-chip that includes a power management circuit.

A block diagram of a system-on-a-chip (SoC) is illustrated in FIG. 9. In the illustrated embodiment, SoC 900 includes power management circuit 901, processor circuit 902, input/output circuits 904, and memory circuit 903, each of which is coupled to power supply signal 905. In various embodiments, SoC 900 may be configured for use in a desktop computer, server, or in a mobile computing application such as, e.g., a tablet, laptop computer, or wearable computing device.

Power management circuit 901 includes power converter circuit 100, which is configured to generate a regulated voltage level on power supply signal 905 in order to provide power to processor circuit 902, input/output circuits 904, and memory circuit 903. Although power management circuit 901 is depicted as including a single power converter circuit, in other embodiments, any suitable number of power converter circuits may be included in power management circuit 901, each configured to generate a regulated voltage level on a respective one of multiple internal power supply signals included in SoC 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 9, in other embodiments, any suitable number of memory circuits may be employed.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Figure 10:
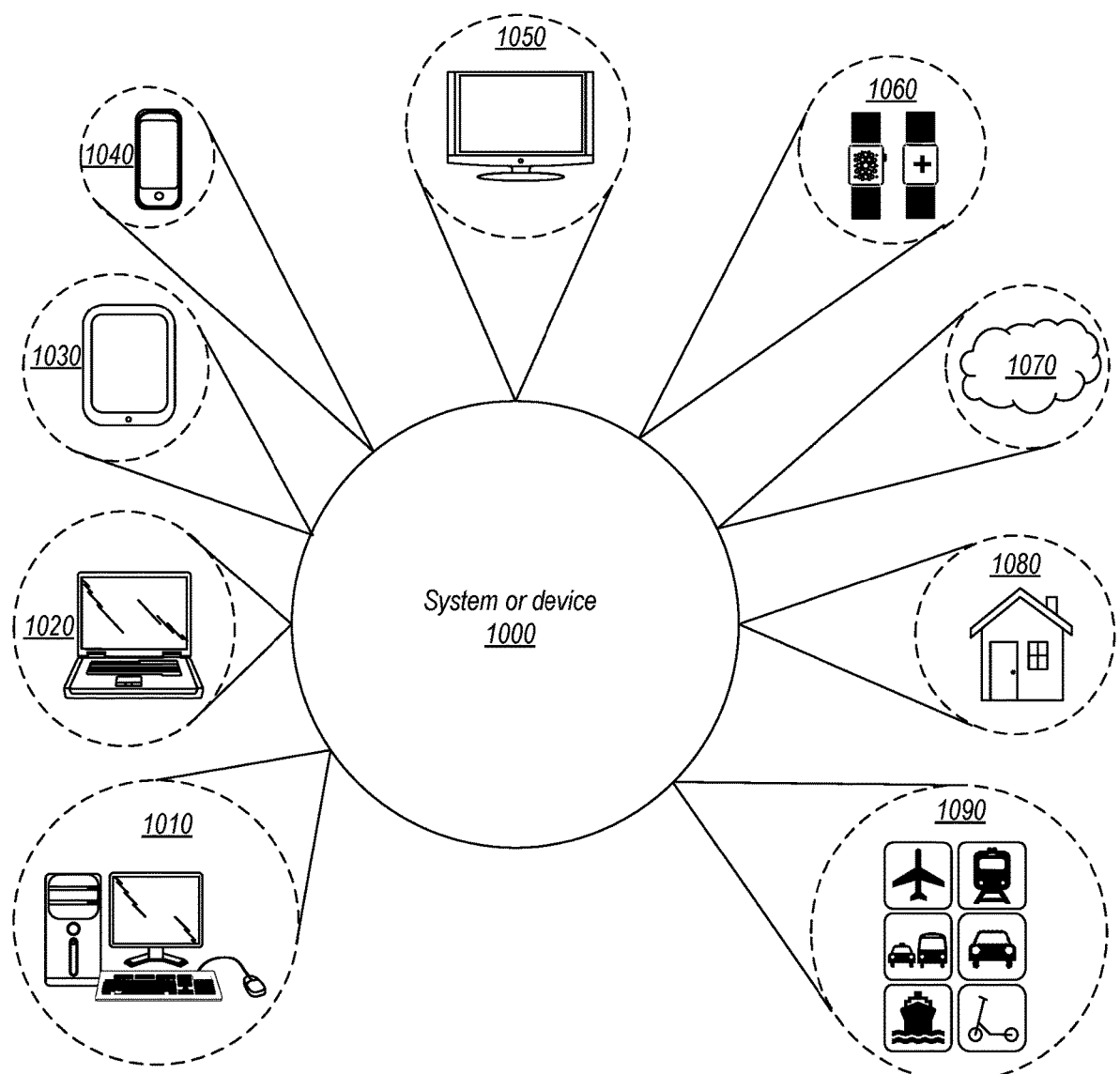
FIG. 10 is a block diagram of various embodiments of computer systems that may include power converter circuits.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
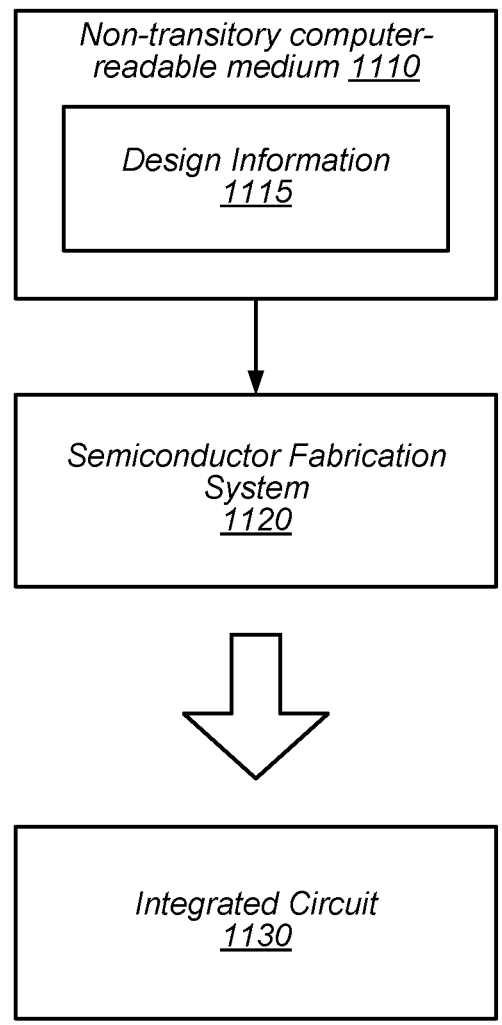
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process design information 1115 stored on non-transitory computer-readable storage medium 1110 and fabricate integrated circuit 1130 based on design information 1115.

Non-transitory computer-readable storage medium 1110 may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor-level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor-level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third," when applied to a particular feature, do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a switch circuit that includes a first switch coupled between an input power supply node and a switch node, wherein the first switch is configured to couple the switch node to the input power supply node during an active time period; and
   a control circuit configured to:
      decrease, during the active time period, an on-resistance of the first switch in response to a determination that a first voltage level of the input power supply node fails to satisfy a threshold value, wherein:
         to decrease the on-resistance of the first switch, the control circuit is further configured to change a gate-source voltage of the first switch, and
         to change the gate-source voltage of the first switch, the control circuit is further configured to adjust, during the active time period, an active level of a control signal generated by the control circuit.

2. The apparatus of claim 1, wherein, to decrease the on-resistance of the first switch, the control circuit is further configured to change the gate-source voltage of the first switch independent of changing a drain-source voltage of the first switch, and wherein the first switch is further configured to couple the switch node to the input power supply node based on the control signal.

3. The apparatus of claim 2, wherein the first switch includes a p-channel metal-oxide-semiconductor field-effect transistor, and wherein to adjust the active level of the control signal, the control circuit is further configured to decrease the active level of the control signal to a second voltage level less than ground potential.

4. The apparatus of claim 3, wherein the control circuit is further configured to:
   perform a comparison of a third voltage level of a regulated power supply node to a reference voltage, the regulated power supply node coupled to the switch node via an inductor;
   generate an activation signal based on a result of the comparison; and
   wherein the control circuit includes a buffer circuit configured to generate the control signal based on the activation signal.

5. The apparatus of claim 4, wherein to change the active level of the control signal, the control circuit is further configured to:
   generate a drive signal, a fourth voltage level of which is less than the ground potential; and couple the drive signal to a virtual ground node of the
buffer circuit in response to the determination that the
first voltage level of the input power supply node fails
to satisfy the threshold value.

6. The apparatus of claim 5, further comprising a charge pump circuit configured to generate the drive signal.

7. The apparatus of claim 1, wherein the control circuit comprises:
a comparator circuit coupled to a logic circuit;
a buffer circuit coupled to the logic circuit; and
a drive circuit coupled to the buffer circuit via a boost node.

8. The apparatus of claim 7, wherein the logic circuit is configured to generate an activation signal based on a signal received from the comparator circuit, and wherein the buffer circuit is configured to adjust the active level of the control signal based on a second voltage level of the boost node.

9. The apparatus of claim 8, wherein:
the comparator circuit includes a first comparator and a second comparator;
the first comparator is configured to generate the activation signal based on a demand current signal and an inductor current signal, the inductor current signal corresponding to a current passing through an inductor configured to couple a regulated power supply node to the switch node;
the second comparator is configured to generate the demand current signal based on a reference voltage value and a third voltage level of the regulated power supply node; and
the reference voltage value indicates a preferred voltage value of the regulated power supply node.

10. The apparatus of claim 9, wherein a magnitude of the demand current signal is proportional to a difference between the reference voltage value and the second voltage level.

11. The apparatus of claim 7, wherein the switch circuit includes a second switch coupled between the switch node and a ground supply node, and wherein the second switch is configured to couple the switch node to the ground supply node during an inactive time period.

12. The apparatus of claim 11, wherein the buffer circuit includes:
a virtual power node coupled to the input power supply node;
a virtual ground node coupled to the ground supply node; and
a plurality of driver circuit coupled to the virtual power node and to the virtual ground node.

13. A method comprising:
determining that a first voltage level of an input power supply node of a power converter circuit fails to satisfy a threshold value, wherein the power converter circuit includes a first switch coupled between the input power supply node and a switch node, the first switch configured to couple the switch node to the input power supply node during an active time period; and
decreasing, during the active time period, an on-resistance of the first switch in response to determining that the first voltage level fails to satisfy the threshold value, wherein:
decreasing the on-resistance of the first switch includes changing a gate-source voltage of the first switch, and
changing the gate-source voltage of the first switch includes adjusting, during the active time period, an active level of a control signal.

14. The method of claim 13, wherein the first switch includes a p-channel metal-oxide-semiconductor field-effect transistor, and wherein changing the active level of the control signal includes setting the active level of the control signal to a second voltage level less than ground potential.

15. The method of claim 14, further comprising monitoring the first voltage level of the input power supply node, wherein monitoring the first voltage level of the input power supply node includes performing a comparison of the first voltage level of the input power supply node to the threshold value, the method further comprising coupling a virtual ground node to a drive signal based on a result of the comparison.

16. The method of claim 15, further comprising generating, by a charge pump circuit, the drive signal wherein a third voltage level of the drive signal is less than the ground potential.

17. The method of claim 15, further comprising:
buffering, by a buffer circuit coupled to the virtual ground node, the control signal to generate a buffered signal; and
coupling, by the first switch and based on the buffered signal, the switch node to the input power supply node.

18. The method of claim 13, further comprising:
activating the control signal in response to determining that a clock signal has been activated;
performing a first comparison of a second voltage level of a regulated power supply node to a reference voltage, the regulated power supply node coupled to the switch node via an inductor; and
generating the control signal based on a first result of the first comparison.

19. The method of claim 18, further comprising performing a second comparison of a third voltage level of the regulated power supply node to the reference voltage; and
de-activating the control signal based on a second result of the second comparison.

20. An apparatus, comprising:
a functional circuit block coupled to a regulated power supply node; and
a power converter circuit that includes a switch circuit and a control circuit, the switch circuit including a first switch coupled between an input power supply node and a switch node, wherein:
the first switch is configured to couple the input power supply node to the switch node during an active time period, and
the control circuit is configured to:
decrease, during the active time period, a resistance between the input power supply node and the switch node in response to a determination that a first voltage level of the input power supply node fails to satisfy a threshold value, wherein, to decrease the resistance between input power supply node and the switch node, the control circuit is further configured to change a gate-source voltage of the first switch, and wherein, to change the gate-source voltage of the first switch, the control circuit is further configured to adjust, during the active time period, an active level of a control signal generated by the control circuit.

21. The apparatus of claim 20, wherein the control circuit is further configured to:
perform a comparison of a second voltage level of the regulated power supply node, the regulated power supply node coupled to the switch node via an inductor; and control the active time period based on a result of the comparison.

22. The apparatus of claim 20, wherein the switch circuit includes a p-channel metal-oxide-semiconductor field-effect transistor, and wherein, to change the active level of the control signal, the control circuit is further configured to decrease the active level of the control signal to a second voltage level less than ground potential.

23. The apparatus of claim 20, wherein the control circuit includes a charge pump configured to generate a drive signal, a third voltage level of which is less than ground potential.

24. The apparatus of claim 23, further comprising a buffer circuit configured to generate the control signal, and wherein to change the active level of the control signal, the control circuit is further configured to couple a virtual ground node of the buffer circuit to the drive signal.

25. The apparatus of claim 20, wherein the control circuit comprises:
- a comparator circuit coupled to a logic circuit;
- a buffer circuit coupled to the logic circuit; and
- a drive circuit coupled to the buffer circuit via a boost node.

\* \* \* \* \*